US012711333B2

(12) United States Patent
Seitz et al.

(10) Patent No.: US 12,711,333 B2
(45) Date of Patent: Aug. 18, 2026

(54) DE-TUNED RFID TAGS HAVING INCREASED SENSITIVITY

(71) Applicant: Fortiss, LLC, Los Angeles, CA (US)

(72) Inventors: Forrest S. Seitz, Beaverton, OR (US); Tyler J. Seitz, Portland, OR (US); Joshua K. Hoyt, Portland, OR (US)

(73) Assignee: FORTISS, LLC, Los Angeles, CA (US)

( * ) Notice: Subject to any disclaimer, the term of this patent is extended or adjusted under 35 U.S.C. 154(b) by 2 days.

(21) Appl. No.: 19/063,619

(22) Filed: Feb. 26, 2025

(65) Prior Publication Data

US 2026/0195553 A1 Jul. 9, 2026

Related U.S. Application Data

(60) Provisional application No. 63/743,342, filed on Jan. 9, 2025.

(51) Int. Cl.
*G06K 7/10* (2006.01)
*G06K 19/077* (2006.01)

(52) U.S. Cl.
CPC ..... *G06K 7/10217* (2013.01); *G06K 7/10356* (2013.01); *G06K 19/07788* (2013.01)

(58) Field of Classification Search
CPC ........... G06K 7/10217; G06K 7/10356; G06K 19/07788
See application file for complete search history.

(56) References Cited

U.S. PATENT DOCUMENTS 5,574,470 A * 11/1996 de Vall ............. G06K 19/07779 343/895
8,395,507 B2 3/2013 Hoyt et al.
8,395,525 B2 3/2013 Hoyt et al.
8,432,283 B2 4/2013 Hoyt et al.
9,984,528 B2 5/2018 Seitz et al.
10,078,767 B2 9/2018 Tsirline
10,088,547 B1 10/2018 Seitz et al.
10,430,621 B2 10/2019 Seitz et al.
(Continued)

FOREIGN PATENT DOCUMENTS

CN 101043921 A 9/2007
CN 104245066 A 12/2014
(Continued)

OTHER PUBLICATIONS

Taiwan Intellectual Property Office, Office Action issued in Taiwan patent application No. 114107450, dated Oct. 14, 2025, 4 pgs.
(Continued)

*Primary Examiner* — Omeed Alizada

(74) *Attorney, Agent, or Firm* — Fountainhead Law Group, PC

(57) ABSTRACT

A radio-frequency identification (RFID) tag includes an antenna with a relatively large number of turns and is de-tuned from an excitation frequency of an RFID reader. The RFID tag, when grouped with other similar RFID tags, uses resonant inductive coupling to channel the magnetic flux density field (B-field) through the group to power each of the tags in the group. As a result, the sensitivity is increased as compared to using an antenna having a smaller number of turns.

20 Claims, 6 Drawing Sheets

(56) References Cited

U.S. PATENT DOCUMENTS

| | | | |
|---|---|---|---|
| 11,346,914 | B2 | 5/2022 | Seitz et al. |
| 11,630,964 | B1 | 4/2023 | Seitz et al. |
| 11,949,156 | B2 | 4/2024 | Fernandez De La Fuente et al. |
| 2007/0197299 | A1 | 8/2007 | Miller et al. |
| 2008/0314707 | A1 | 12/2008 | Junghanns |
| 2009/0027208 | A1 | 1/2009 | Martin et al. |
| 2009/0051612 | A1 | 2/2009 | Shimizu |
| 2012/0262357 | A1 | 10/2012 | Kato et al. |
| 2014/0235308 | A1 | 8/2014 | Hoyt et al. |
| 2014/0291399 | A1 | 10/2014 | Koyama |
| 2016/0217645 | A1 | 7/2016 | Seitz et al. |
| 2021/0011107 | A1* | 1/2021 | Seitz ..................... G07F 17/322 |
| 2021/0383638 | A1 | 12/2021 | Imura |
| 2023/0214611 | A1 | 7/2023 | Seitz |
| 2024/0385312 | A1 | 11/2024 | Seitz et al. |

FOREIGN PATENT DOCUMENTS

| | | | |
|---|---|---|---|
| TW | 200540722 | A | 12/2005 |
| TW | 14224 | A | 1/2024 |
| WO | 2022186919 | A1 | 9/2022 |

OTHER PUBLICATIONS

Youbok Lee, “RFID Coil Design”, Microchip Technology Inc., (1998), 21 pages.

Microchip, “microID® 13.56 MHz RFID System Design Guide”, 214 pages (2004).

Nam Ha-Van, et al., “Effective Mid-Range Wireless Power Transfer with Compensated Radiation Loss”, AAlo University, 16 pages (Jan. 7, 2023).

“Tesla Coil”, Retrieved from https://en.wikipedia.org/w/index.php?title=Tesla_coil&oldid=1231398017 , 23 pages.

Aristeidis Karalis, et al., “Efficient wireless non-radiative mid-rangeenergy transfer”, Science Direct, Annals of Physics, 15 pages (2007).

Related International Search Report and Written Opinion, International Application No. PCT/US24/44427 filed Aug. 29, 2024, 13 pages.

Related Taiwan Application No. 113132879 filed Aug. 30, 2024; First Office Action with Search Report issued Mar. 11, 2025, English Translation included, 8 pages.

* cited by examiner

RFID tag
200

RFID tag
300

DE-TUNED RFID TAGS HAVING INCREASED SENSITIVITY

CROSS REFERENCE TO RELATED APPLICATIONS

The present application claims the benefit of U.S. Provisional App. No. 63/743,342 for "De-Tuned RFID Tags Having Increased Sensitivity" filed Jan. 9, 2025, which is incorporated herein by reference.

BACKGROUND

The present invention relates to gaming, and in particular, to radio frequency identification (RFID) tags that are de-tuned and have increased sensitivity resulting from the interaction between the number of turns of the RFID antenna and resonant coupling.

Unless otherwise indicated herein, the approaches described in this section are not prior art to the claims in this application and are not admitted to be prior art by inclusion in this section.

Gaming generally refers to a competitive contest between two or more entities (e.g., people) using game pieces or tokens. Using electronics to determine or track the locations or types of the game pieces is often more efficient than manually determining or tracking their locations or types. Types of gaming include non-monetary gaming and monetary gaming.

Regarding monetary gaming, tracking the location of gaming tokens in real-time on a gaming table has the potential to revolutionize the gaming industry by providing cash management and improved security. Tying this data to specific players allows casinos to create accurate player profiles while simultaneously alleviating the dealer and pit boss of mundane tasks that take years of training to hone.

Traditional RFID systems have tried to address the gaming market with limited success. In a typical RFID system, the excitation antenna defines a "working volume" within which the energy projected by the antenna is sufficient to power the RFID tag. This "working volume" is generally omnidirectional in nature with poorly defined bounds with radio frequency (RF) power as the only option to adjust the read range. But doing so extends the read range in all directions, introducing cross-talk errors when multiple antennas are in close proximity. Typical RFID products on the market suffer from multiple shortcomings, including being limited to discrete spots (referred to as "betting spots" in a monetary gaming context), having limited gaming token stack heights, having poor discrimination between adjacent spots, and having higher than acceptable read errors.

These shortcomings limit the available technology to games where the spots are widely separated, or to simply identifying counterfeit tokens prior to their use on a gaming table.

A number of patents by the present inventors have been directed toward addressing these shortcomings, as demonstrated in U.S. Pat. Nos. 8,395,525; 8,395,507; 8,432,283; 9,984,528; 11,346,914; and 11,630,964. These patents work in concert to track individual gaming tokens on a gaming table (e.g., in a monetary gaming context, the bets and payouts on typical casino games). To distill these patents as applied to the design of RFID tags to their essence, there are three fundamental concepts that work in concert. The first concept is the presence of a coupling capacitor that extracts only the energy needed from the excitation field sufficient to power the RFID tag. The second concept is tuning the resonance of each tag to a frequency above that of the excitation frequency such that any coupling between tags will move the resonance toward the excitation frequency. The third concept is shaping the B-field generated by the excitation antenna.

The embodiments described in these earlier patents addressed the third concept (shaping the B-field) primarily by using a ferrite core or other high-permeability material in each tag. This ferrite core collimates the B-field by using material properties to increase the flux density in a specific manner.

Ferrite Core Overview

The construction of the ferrite core chips is based on non-resonant coupled induction similar to a typical transformer. This allows RFID technology to exploit near-field coupling with the added benefits including an efficient energy transfer between reader and tags, dynamic beam forming of the H-field as tags are added to or removed from the excitation field, and the capability to resolve spatial coordinates of tags in the excitation field.

The quality factor (also referred to as the "Q factor" or "Q") is a dimensionless parameter that compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency, so the oscillations die out more slowly.

Regarding RFID circuits, Q is a measure of the "quality" desired in a well-tuned circuit or other resonator. More specifically, when an RFID tag is driven by a sinusoidal excitation signal, its resonant behavior depends strongly on Q. Resonant systems respond to frequencies close to their natural frequency much more strongly than they respond to other frequencies. An RFID tag with a high Q resonates with a greater amplitude (at the resonant frequency) than one with a low Q factor. The amplitude of the resonant response affects the read range. To increase sensitivity and read range, most existing RFID tags have a relatively high Q. As a specific example, the Q of many existing RFID tags is between 10 and 20.

When multiple tags are in close proximity, however, they interact. This interaction changes their resonant frequency of operation. Instead of a single resonance at the desired frequency, this interaction results in multiple resonances at undesirable frequencies. As a result, tags are not energized and/or data is not successfully exchanged when tags are in close proximity. Various approaches may be used to mitigate this interaction, but these strategies typically reduce the read range. Compensating this reduction in read range by increasing the power output of the reader is possible but not always practical.

The ferrite core tags were designed to meet this need to read RFID tags in close proximity, and to do so with an acceptable read range.

In the inventions based on the ferrite core, the resonance of each individual tag is set to around 50 MHz (vs. 13.56 MHz) with the inductive coupling of multiple tags changing this resonance. The reader is designed to be able to read a single tag even though the tag's resonance is much higher than 13.56 MHz due to its proximity to the excitation antenna. As more chips are added, the overall resonance of the plurality of chips is reduced, moving closer to 13.56 MHz due to the tight magnetic coupling of the ferrite. Thus, as the number of tags increases, the read range is extended with the lower Q of the excitation antenna offset by the inherent efficiency of the ferrite core. As a result, the system operates at low power with significant read range despite tag-to-tag coupling.

Equally important is the ability of the ferrite to direct the H-field away from neighboring tags, as this is what provides spatial resolution and allows one to assign specific tags to specific excitation antennas.

Using monetary gaming as an example, Roulette provides an extreme case: if one player is winning and deemed "hot" by the other players, a bet placed by one person can be quickly followed by others placing the same or similar bets. This results in tall stacks of chips surrounded by other tall stacks of chips. The specific challenges include that the spacing of legitimate betting spots is very close, and that the number of chips on any particular spot can be substantial—with stacks often exceeding 30 chips.

Another important characteristic of virtually all RFID tags is the presence of a protection Zener diode whose job is to protect the rest of the circuit from overvoltage. This protection diode is designed to burn up excess energy as heat—a good idea in most applications but one that is limiting when tags are stacked. The ferrite core system adds passive components to achieve two purposes. The first purpose is achieved by using an inductor to tune out the built-in capacitance of the tag. (Many tags have built-in capacitance to resonate with the antenna coil; tags can be purchased with different capacitance values or with no capacitance at all.) The second purpose is achieved by using a capacitor to lightly couple into the antenna with only the energy needed to power the tag, thereby greatly reducing the effect of the Zener clamp diode and leaving the surplus energy to power other tags instead of being dissipated as heat.

SUMMARY

An embodiment of the present disclosure is directed toward RFID tags that use resonant coupling to focus the B-filed through a stack of tags for improved detection and antennas with a large number of turns for improved sensitivity.

In contrast to the embodiments using the ferrite core, the embodiments described herein collimate the B-field in a novel and unexpected way without the need for high-permeability materials. Specifically, the embodiments described herein use careful tuning of each tag to create a resonant coupling effect. This resonant coupling effect results in a resonance that, when proximal to other similarly-tuned tags, creates a "lensing effect" that collimates the B-field, in a manner analogous to optical lenses that focus energy in one (desired) dimension and minimize the impact in other directions.

This resonant coupling is a novel and unexpected result of having a plurality of carefully tuned RFID tags that interact in a constructive manner.

Additionally, this resonant coupling differs from the non-resonant coupled induction of the existing ferrite core technology.

The improved sensitivity of the tags is an unexpected result of increasing the number of turns of the antenna.

The potential benefits of the embodiments described herein include a reduced cost-of-goods when manufacturing the tags by eliminating the need for ferrite materials, simplified manufacturing processes, improved performance due to tighter manufacturing tolerances of key components, and improved aesthetics (omitting the exposed ferrite allows for a wide range of decal types and designs).

According to an embodiment, a radio-frequency identification (RFID) tag includes RFID tag electronics and an antenna assembly coupled to the RFID electronics. The antenna assembly includes an antenna, where the antenna has more than 5 turns and has a capacitance. The RFID tag has a resonant frequency resulting from the antenna assembly, where the resonant frequency of the RFID tag is higher than an excitation frequency of a transmission generated by an RFID reader. The RFID tag is one of a number of RFID tags in proximity in a grouping, where the grouping of RFID tags shapes a magnetic flux density field of the transmission generated by the RFID reader through the grouping of RFID tags. The grouping of RFID tags has a resonant frequency that is lower than the resonant frequency of each of the plurality of RFID tags considered individually due to resonant coupling. The transmission generated by the RFID reader powers the RFID tag electronics via the resonant coupling. A sensitivity of the RFID tag increases as a number of turns of the antenna increases.

The following detailed description and accompanying drawings provide a further understanding of the nature and advantages of embodiments of the present invention.

DETAILED DESCRIPTION

Figure 1:
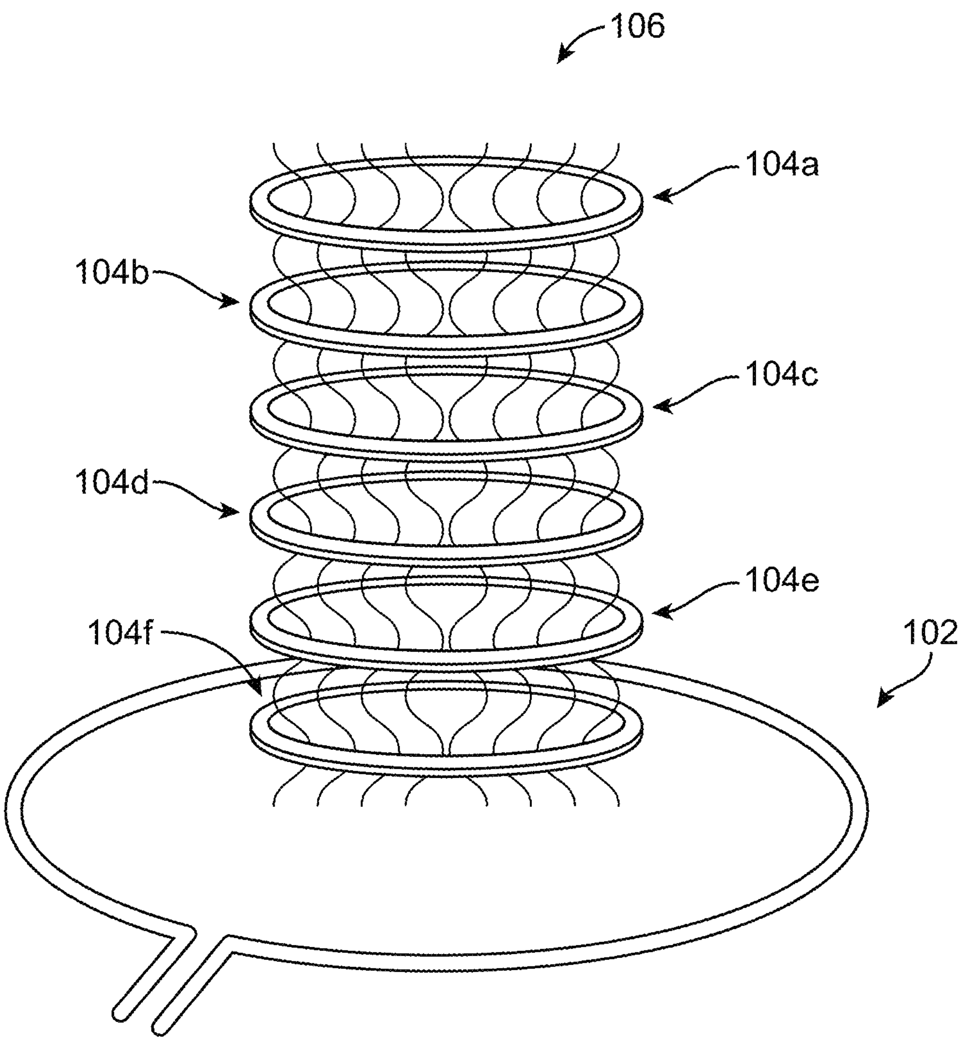
FIG. 1 is a perspective view showing an example of the resonant coupling effect collimating the B-field.

Described herein are techniques for constructing RFID tags. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive- or is intended, such will be specifically noted (e.g., "either A or B", "at most one of A and B").

In this document, the terms "RFID tag", "RFID gaming tag", "RFID chip", "RFID gaming chip", "gaming chip", and "gaming token" are used. Such terms are to be read as being broadly synonymous. (More precisely, an "RFID chip" may be used to refer to the integrated circuit components of the "RFID tag", which also includes additional components such as an antenna, a rigid housing, etc. However, this document is mostly concerned with the broad usage for these terms.) The RFID tag responds to a radio frequency signal from the RFID reader, generally with its serial number or other identifier, enabling the RFID reader to obtain an inventory of the RFID tags in the vicinity. In a gaming context, the RFID gaming tags may be placed on, removed from, or moved around on a gaming table according to various game rules. In a monetary gaming context, the RFID gaming tags may be used for making bets and payouts, and may be marked with a value identifier (e.g., $1).

Resonant Coupling Overview

Unlike flux density concentration enhanced by the presence of ferrite materials, the present disclosure uses the physics of resonant inductive coupling (also called magnetic phase synchronous coupling or resonant coupling). This phenomenon exploits inductive coupling between a source and a secondary load. Resonant inductive coupling is the near-field wireless transmission of electrical energy between magnetically coupled coils, which is part of a resonant circuit on a tag tuned to resonate at the same frequency as the driving frequency. Specifically, the efficiency of the energy transfer between the driving coil and the receiving coil is dramatically improved when the secondary load is tuned to resonate at the excitation frequency. To maximize the efficiency of this energy transfer, the resonance circuit has a very high Q. This increase in energy transfer efficiency shapes the B-field with the net effect of directing the B-field in a controlled manner.

Resonant inductive coupling (RIC) was first demonstrated by Nikola Tesla in 1894 and has been successfully employed by others in a range of applications including a notable demonstration of wireless power transfer by Marin Soljačić of MIT in 2007.

Regarding wireless power transfer, traditional wireless charging techniques use a pair of coils—one on a charging pad or dock and one in the device to be charged—with a small air gap between them. The work done by Soljačić as well as researchers at Aalto University in Finland (Physical Review published 20 Jul. 2023) have shown that careful tuning of the antenna loops can achieve power transfer efficiencies of 80% while minimizing radiation losses with air gaps of several inches. Additional work is being done to apply this idea to charging vehicles in motion. In all cases, the target application is trickle charging at a distance.

Regarding RFID, the resonant inductive coupling phenomenon has also been applied—in very limited and specific use cases—to data transmission from individual active circuits (e.g., implantable medical devices) as well as passive circuits (e.g., passports and contactless smart cards). However, all of these applications use well-established techniques outlined in numerous manufacturer's application notes (e.g., "RFID Coil Design", Microchip application note 00678b.pdf). Specifically, the secondary circuits are tuned to the excitation frequency (e.g., 13.56 MHz) with a very high Q to maximize read range sensitivity. All known current applications—as noted—have been limited by the same issues that plagued all RFID applications that have tried to read multiple closely spaced tags in the excitation field: The tags will couple and de-tune to where the resonance frequency of the tags falls outside the band of the RFID reader and are therefore not read.

Our previous inventions—which centered on the ferrite core—overcame this fundamental limitation by increasing the energy transfer efficiency between excitation antenna and RFID tags. This allowed de-tuning of the resonance of the individual tags—thereby making them insensitive to resonance shifts cause by coupling.

RESONANT COUPLING EMBODIMENTS

The embodiments described in the present disclosure use tight coupling (similar to a coreless transformer) between a source (in our case, an excitation antenna) and a receiver (in our case, one or more RFID tags). However, there are several important differences from typical RIC used for charging at a distance or reading a smart card. A first difference is that an embodiment uses the efficiency of the excitation channel to transmit information to/from multiple RFID tags instead of a single charging coil/tag. A second difference is that an embodiment operates with a well-defined distance between the excitation coil and the tags. A third difference is that the tags are uniformly spaced in an embodiment. A fourth difference is that an embodiment has a fundamentally different design of the passive tag antenna than a traditional RFID tag. A fifth difference is that an embodiment exploits the coupling between tags to focus the B-field to further improve the efficiency of the energy and data transfers. (Note that a given embodiment may have one or more of the above differences from typical RIC.)

As noted earlier, the embodiments described herein may incorporate a number of features from earlier patent applications by the present inventors. One similar feature is the design of tags tuned to a (higher) non-optimum frequency such that a reader is able to read a single tag as well as able to read multiple tags even though the resonance of the plurality of tags has shifted their resonant frequency due to coupling between tags. Another similar feature is the use of a series capacitor to lightly couple the tag antenna to the RFID tag to limit the impact of the overvoltage protection.

The embodiments described in the present disclosure have one key difference when compared to the earlier work based on a ferrite core: The tight coupling between the excitation antenna and the plurality of tags is achieved without the need for ferrite (or other flux concentrating materials). The present disclosure describes embodiments that tunes this LC (inductance-capacitance) circuit in a manner that shapes the B-field. Furthermore, when this tuning is to a higher frequency (e.g., 21.8 MHz) than the operating frequency of the reader where the reader is still able to read a single tag—largely due to its proximity to the excitation antenna, a plurality of tags can still be read because the coupling between tags has moved (e.g., lowered) the resonant frequency of interest to be close to the primary excitation frequency (e.g., 13.56 MHz).

As a consequence of the resonant coupling, when multiple tags are similarly tuned (e.g., to 21.8 MHz), the B-field is shaped—much like an optical lens—such that the flux is highly collimated. As a result, embodiments may have greatly increased efficiencies in energy coupling and robust energy (and data) transfer even when this coupling amongst multiple tags has shifted the resonant frequency of the tags, thereby collimating the B-field in a manner that allows precise determination of the spatial coordinates of each tag.

FIG. 1 is a perspective view showing an example of the resonant coupling effect collimating the B-field. FIG. 1 includes an antenna 102 and a number of RFID tags 104 (individually 104*a*-104*f*). The antenna 102 may be implemented in a gaming table (not shown) on which the RFID tags 104 are used for gaming purposes. The RFID tags 104 may be non-optimally tuned, e.g. to 21.8 MHz for a primary excitation frequency of 13.56 MHz. The RFID tags 104 are shown without their housing, to show how the thickness of each tag provides consistent (e.g., uniform) spacing between the tags and how the antenna and other components produce the resonant coupling to collimate a B-field 106 (shown as the wavy vertical lines). Surprisingly, this resonant coupling collimates the B-field in a manner similar to that provided by ferrite core RFID tags, but without requiring the ferrite core. The resulting increased efficiency and the proximity of the closest tag to the excitation field is what allows for the non-optimum tuning of the tags—thereby eliminating the sensitivity to coupling amongst the plurality of tags.

Clearly, uniform geometry of the tags adds to predictability of performance, but other embodiments may be used in other applications. The characteristics of the components used may be adjusted as needed in each other application.

Figure 2:
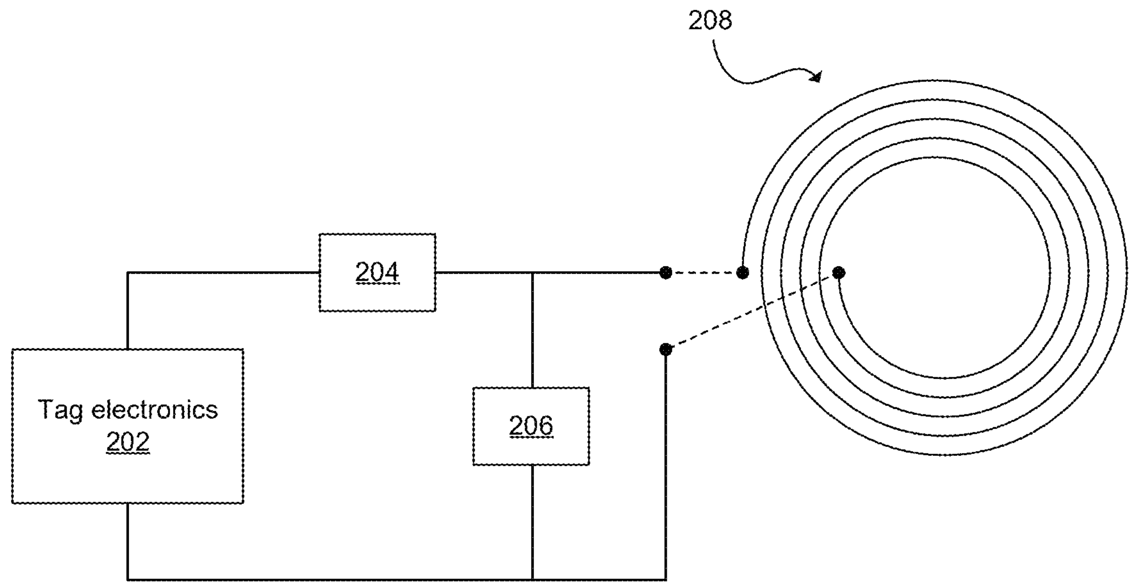
FIG. 2 is a block diagram of an RFID tag 200.

FIG. 2 is a block diagram of an RFID tag 200. The RFID tag 200 includes tag electronics 202, a series circuit element 204, a parallel circuit element 206 (optional), and an antenna 208. The RFID tag 200 may also include a housing (not shown) to give the RFID tag 200 the form factor of a gaming token, e.g., a circular shape, a rectangular shape, etc., in various sizes. As a specific example, the housing may provide the RFID tag 200 with a circular form factor having a diameter of 39 mm and a thickness of 3.3 mm.

The tag electronics 202 generally implements the RFID functionality for the RFID tag 200. The tag electronics 202 may be provided by an existing, commercially available RFID tag electronics integrated circuit. As a specific example, the tag electronics 202 may correspond to a ICODE ILT-M RFID integrated circuit from NXP Semiconductors that implements the ISO 18000-3 mode 3 RFID standard.

The series circuit element 204 generally provides the tag electronics 202 with power received at the antenna 208 in the excitation signal from an RFID reader (not shown). The tag electronics 202 includes an overvoltage protection circuit (not shown; e.g., a Zener diode) to protect the other circuit structures of the tag electronics 202 from an overvoltage condition. In a typical RFID use case, the RFID reader is intending to only read a single RFID tag, so the RFID tag electronics 202 includes the protection circuit to dissipate as heat the excess energy received in the excitation signal from the reader. However, in a use case like gaming where the RFID reader may read multiple RFID tags, the series circuit element 204 functions to lightly couple the tag electronics 202 to the energy received by the antenna 208. As a result, the tag electronics 202 receives only a portion of the total energy from the RFID reader, and the remainder of the energy is able to be received by other RFID tags nearby. In an embodiment, the series circuit element may include a capacitor, referred to as the series capacitor. As an example, the series capacitor may be between 1.8 and 3.9 pF (e.g. 2.2 pF), with a range of 1.8 to 3.0 pF working well in an embodiment. The series circuit element 204 may also include other circuit structures, such as inductors or resistors.

Functionally, the series circuit element 204 (also referred to as the decoupling capacitor or the coupling capacitor) decouples the RFID integrated circuit (also referred to as the RFID chip) from the antenna. In the absence of the decoupling capacitor, the nearest RFID tag in a grouping of RFID tags may absorb a disproportionate amount of the energy from the RFID reader, reducing the energy available to power the other RFID tags in the grouping. The decoupling capacitor thus allows more of the energy to be available to the other RFID tags. In addition, certain off-the-shelf RFID chips include an overvoltage protection diode, and the decoupling capacitor helps to reduce the energy from the RFID reader provided to the RFID chip by limiting the amount of energy the overvoltage protection diode receives from the excitation signal. In custom RFID chips (see FIG. 3) the overvoltage protection diode may be omitted, and consequently the decoupling capacitor may also be omitted.

The parallel circuit element 206 (optional) generally includes a capacitor operating as a tuning capacitor that, in combination with the antenna 208 and series combination of the series circuit element 204 and the tag electronics 202, results in the resonant frequency of the RFID tag 200. (Note that the contribution of the series circuit element 204 and the tag electronics 202 to the resonant frequency is relatively minor.) As an example, when the antenna 208 has 10 turns, a capacitance of 11 pF for the parallel circuit element 206 results in a resonant frequency of 21.8 MHz for the RFID tag 200. In such a case, the parallel circuit element 206 may be referred to as the parallel capacitor, the tuning capacitor or the shunt capacitor. The parallel circuit element 206 is described as being optional because it may be omitted when the antenna has a large number of turns, e.g. more than 34. The relationship between the number of turns, the capacitance, and the resonant frequency is further detailed below.

The antenna 208 generally receives the read signal and other communications from the RFID reader. The antenna 208 may be a circular loop antenna with an outer diameter of 30.5 mm and an inner diameter of 25.4 mm, making it suitable for use with an RFID tag having a circular form factor with a diameter of 39 mm. The antenna 208 has a self-capacitance based on the number of turns, as further detailed below. (To reduce clutter, only five turns are shown and not to scale.) This self-capacitance in parallel with the with the tag electronics 202 results in the resonant frequency of the RFID tag 200. For example, when the given antenna 206 is constructed with 35 turns and a trace width of 0.15 mm, a resonant frequency of 21.8 MHz results without the parallel circuit element 206. The antenna 208 may be a component of an antenna assembly that includes other components such as the parallel circuit element 206.

As further detailed below, the RFID tag 200 has a resonant frequency resulting from the antenna 208 and the parallel capacitor 206, where the resonant frequency of the RFID tag is higher than an excitation frequency of a transmission generated by the RFID reader. In general, the resonant frequency of the RFID tag 200 is between 1.5 and 2.2 times the excitation frequency of the transmission generated by the RFID reader. For example, the resonant frequency of the RFID tag 200 may be 21.8 MHz, and the transmission generated by the RFID reader may be 13.56 MHz. Such a difference is considered inefficient for the single RFID tag case, however in a gaming environment the closeness of the RFID tag 200 to the RFID reader means that the inefficiency of the received signal power is still sufficient for operation of the RFID tag 200.

However, when the RFID tag 200 is one of a number of similar RFID tags in proximity in a grouping, the grouping shapes a magnetic flux density field of the transmission generated by the RFID reader through the grouping. As a result of the resonant coupling, the grouping has a resonant frequency that is lower than that of the RFID tag 200 considered by itself. As a specific example, the excitation frequency of the RFID reader is 13.56 MHz, and the resonant frequency of the grouping of tags is within 10% (e.g., between 12.20 and 14.923 MHz).

In a gaming context, proximity generally means that the RFID tags are located within a single, defined gaming spot. Generally each gaming spot is associated with an antenna that is connected to the RFID reader, and the RFID reader reads all of the RFID tags nearby that antenna (e.g., all the RFID tags located in the corresponding gaming spot). In a monetary gaming example, a Roulette table may have a gaming spot for each of the bets that are available to be made (e.g., over 100 gaming spots).

In a gaming context, grouping generally means that the RFID tags are together within a bounded area and are to be treated equivalently in the specific gaming environment. Generally the bounded area corresponds to a gaming spot, and the grouping may be a stack (see FIG. 1) or a pile. Generally the tags in a stack are fully overlapping, but they may also be partially overlapping. Generally the tags in a pile are partially overlapping. As discussed above, the grouping results in the resonant coupling among the RFID tags collectively. The coupling is most efficient for the stack, but it also occurs for the pile, with the efficiency increasing as the amount of overlapping increases.

As a result of the resonant coupling, the transmission generated by the RFID reader powers the tag electronics 202 to perform RFID operations.

In summary, the RFID tag 200 may include have one or more of the following features: a smaller coupling capacitor (e.g., 204) of approximately 2.2 pF; the presence of stray capacitance in the multi-turn antenna loop that contributes to the resonant frequency, and a resonance of less than 23 MHz for a single tag.

The size and configuration of the antenna 208, and the capacitance of the parallel capacitor 206, may be adjusted as desired to achieve different resonant frequencies for the RFID tag 200. Further example configurations for the antenna 208 and the parallel capacitor 206 are discussed below. Additionally, other components may be added to the RFID tag 200 to change its resonant frequency, as desired.

Figure 3:
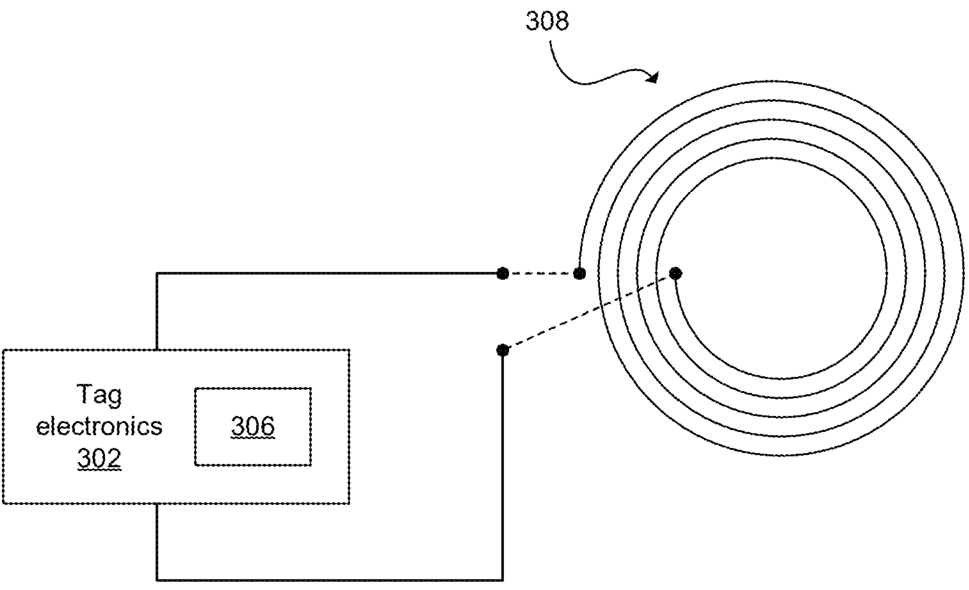
FIG. 3 is a block diagram of an RFID tag 300.

FIG. 3 is a block diagram of an RFID tag 300. The RFID tag 300 includes tag electronics 302, a parallel circuit element 306 (optional), and an antenna 308. The RFID tag 300 is similar to the RFID tag 200 (see FIG. 2), except that the tag electronics 302 is customized for the resonant coupling embodiments, whereas the tag electronics 202 uses existing commercially available RFID integrated circuitry.

More specifically, the tag electronics 302 omits the over-protection circuit (e.g., Zener diode) that was present in the tag electronics 202. As a result, the series circuit element 204 is not needed in the RFID tag 300. In addition, the parallel circuit element 306 (e.g., a capacitor) has been included as a component of the tag electronics 302, instead of being a separate element as with the parallel capacitor 206. For example, the desired capacitance may be provided by metal layers deposited on a non-conductive film, also referred to as the RFID inlay. As with the parallel circuit element 206, the parallel capacitor 306 may be reduced or omitted entirely as the number of turns of the antenna 308 increases. The antenna 308 is generally similar to the antenna 208.

The RFID tag 300 may include a coupling capacitor (similar to the series circuit element 204 in FIG. 2) as a component. As with the series circuit element 204, the coupling capacitor may be relatively small (e.g., approximately 2.2 pF), and may be implemented as a discrete component, as copper traces on the substrate of the RFID tag 300 (e.g., as an inlay), or as a subcomponent of the tag electronics 302.

As with the RFID tag 200, the parameters of the components of the RFID tag 300 including the parallel capacitor 306 and the antenna 308 may be adjusted as desired to adjust the resonant coupling effect, including adjusting the resonant frequency of the RFID tag 300. As further detailed below, the number of turns of the antenna 308 and the capacitance of the parallel capacitor 306 have an inverse relationship, so for a large number of turns the capacitance of the parallel capacitor 306 (or 206) may be reduced due to the increase in inductance of the antenna 308.

The RFID tag 200 and the RFID tag 300 both leverage previous experience (e.g., U.S. Pat. No. 11,346,914) in which the increased efficiency of the modified B-field (whether generated by ferrite materials or by resonant inductive coupling) allows an RFID reader to work irrespective of changes in resonance caused by coupling between tags. While the extent of the coupling between ferrite core (FC) tags and resonant inductive coupling (RIC) tags is markedly different, the results can still be used to achieve the desired goals of the gaming application; specifically, to correctly assign a plurality of tags to their respective antennas with a spatial resolution sufficient to track individual gaming tokens on a gaming table. As a specific monetary gaming example, a Roulette table using the RFID tags 200 or 300 may track individual bets at each of the 100 or more betting spots.

The RFID tag 200 and the RFID tag 300 both differ from many existing RFID tags used for gaming. A typical RFID tag has an antenna with 5 turns and 5.9 uH inductance, a capacitance of 23.5 pF internal to the tag electronics, and is tuned to 13.56 MHz. A typical ferrite core RFID tag, in addition to the ferrite core, adds a series (coupling) capacitor of 3.0 pF, is tuned to 54 MHz, and includes a parallel inductor of 4.7 uH to tune out the internal capacitance of 23.5 pF in the tag electronics. See, e.g., U.S. Pat. No. 8,432,283. A typical resonant coupling RFID tag has an antenna with 5 turns, a series (coupling) capacitor of 3.9 pF, tag electronics with 0 pF internal capacitance, and is tuned to 23 MHz. See, e.g., International Application No. PCT/US2024/044427 (not yet published).

Figure 4:
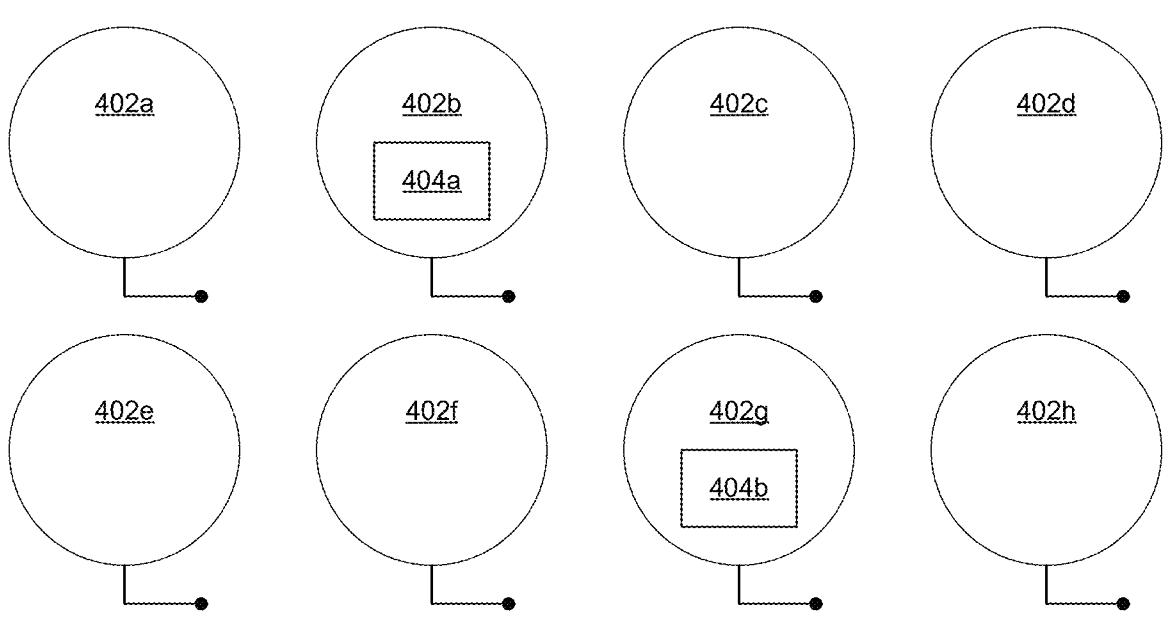
FIG. 4 is a block diagram of an RFID system 400.
Figure 4:
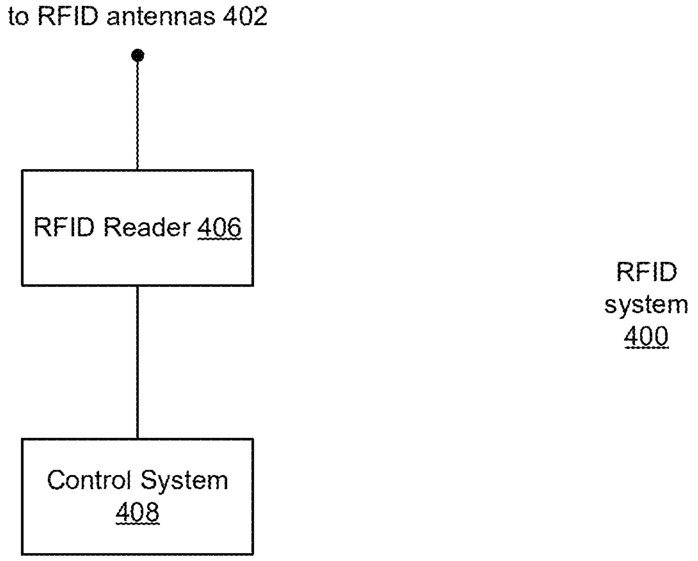

FIG. 4 is a block diagram of an RFID system 400. The RFID system 400 generally operates with the resonant coupling gaming tokens described herein, e.g. the RFID tag 200 (see FIG. 2), the RFID tag 300 (see FIG. 3), etc. The RFID system 400 may be implemented in a gaming table. As a specific monetary gaming example, the RFID system 400 may be implemented in a Roulette table. The RFID system 400 includes a number of RFID antennas 402, a number of RFID tags 404, one or more RFID readers 406, and a control system 408. The RFID system 400 may also include other components that (for brevity) are not described in detail.

The RFID antennas 402 (8 shown, 402*a*-402*h*) are arranged at various locations on the gaming table. In general, each of the RFID antennas 402 is associated with one of the gaming spots on the gaming table. However, more than one RFID antenna may be associated with a single gaming spot, for example a large gaming spot may have multiple smaller antennas instead of a single large antenna. The RFID antennas 402 may be arranged in a grid or overlapping manner, for example as described in U.S. Pat. Nos. 9,666,022 and 10,088,547. In such a case, the intersection of two antennas (e.g., in the X and Y directions) defines a gaming spot for the detection of RFID tags, for example by determining the location of the RFID tag by interpolation based on the signal strength information, phase information, etc.

Each of the RFID tags 404 generally corresponds to a resonant coupling gaming token described herein, e.g. the RFID tag 200, the RFID tag 300, etc. The RFID tags 404 may be placed around the gaming table in the various gaming spots corresponding to the RFID antennas 402. Two groupings of RFID tags are shown, 404*a* and 404*b*.

The one or more RFID readers 406 connects to the RFID antennas 402. (To reduce clutter in the figure, the complete connecting line to each of the antennas 402 is not shown.) Each of the one or more RFID readers 406 may connect to more than one of the RFID antennas 402, for example via a multiplexer or switching network (not shown). The one or more RFID readers 406 may be a single RFID reader in certain embodiments, for example when the number of the RFID antennas 402 is small or the single RFID reader operates sufficiently quickly in a given gaming environment.

In general, the one or more RFID readers 406 (referred to as the RFID reader 406 for brevity) generates an excitation signal that it transmits via the RFID antennas 402; any of the RFID tags 404 that receive the excitation signal then communicate with the RFID reader according to their RFID protocol. As discussed above, the RFID tags 404 are each tuned to a higher resonant frequency than that of the excitation signal generated by the RFID reader 406, but due to the resonant coupling effect, a grouping of the RFID tags 404 has a lower resonant frequency and thus more closely matches that of the RFID reader 406. The excitation signal for RFID transmissions is generally 13.56 MHz, but similar results may be obtained using a nearby excitation frequency, for example between 13 and 14 MHz. Furthermore, other RFID frequencies may be used, such as 6.78 MHz or 27.125 MHz, with corresponding adjustments to the components of the RFID tags. As a specific example, the RFID reader 406 may generate a signal at 13.56 MHz and the RFID tags 404 may be tuned to 21.8 MHz; but a grouping of the RFID tags 404 will have a lower resonant frequency than 21.8 MHz, with the exact resonant frequency depending upon the number of tags in the grouping, the arrangement of the tags in the grouping, etc. Other embodiments may use other resonant frequencies, as desired, according to the sensitivity of the RFID reader.

The control system 408 generally controls the operation of the RFID system 400. For example, the control system 408 may control the RFID reader 406 to send a read signal via a selected one of the RFID antennas 402. The subset of the RFID tags 404 in the gaming spot associated with the selected RFID antenna respond with their tag identifiers, and the control system 408 associates those tag identifiers with the gaming spot associated with the selected RFID antenna. In this manner, the RFID system 400 tracks the location of the RFID tags 404 on the gaming table. As another example, the control system 408 may control the operation of a multiplexer or switching network (not shown) to connect the RFID reader 406 to the selected one of the RFID antennas 402. A processor and a memory, for example as implemented in a computer, may perform the functions of the control system 408.

The RFID system 400 may operate with other features described in other patent applications by the present inventors. For example, the RFID system 400 may operate with the network analyzer system described in U.S. Pat. No. 10,430,621. As another example, the RFID system 400 may operate with the antenna array system described in U.S. Pat. No. 10,088,547. As another example, the RFID system 400 may operate with the network analyzer and controllable reactance network system described in U.S. Pat. No. 11,630,964. As another example, the RFID system 400 may operate with the SPEEDscan systems described in U.S. Application Pub. No. 2024/0385312.

Antenna Sensitivity

Embodiments are directed to improving the sensitivity of RFID tags. In general, "sensitivity" corresponds to transmission gain, and corresponds to the countersign of attenuation or transmission loss. As such, for a given transmission power level from the RFID reader, increasing the sensitivity of the RFID tag increases the distance at which the RFID tag can be read. As further detailed below, increasing the number of turns of the antenna in the RFID tag increases the sensitivity of the RFID tag.

Figure 5:
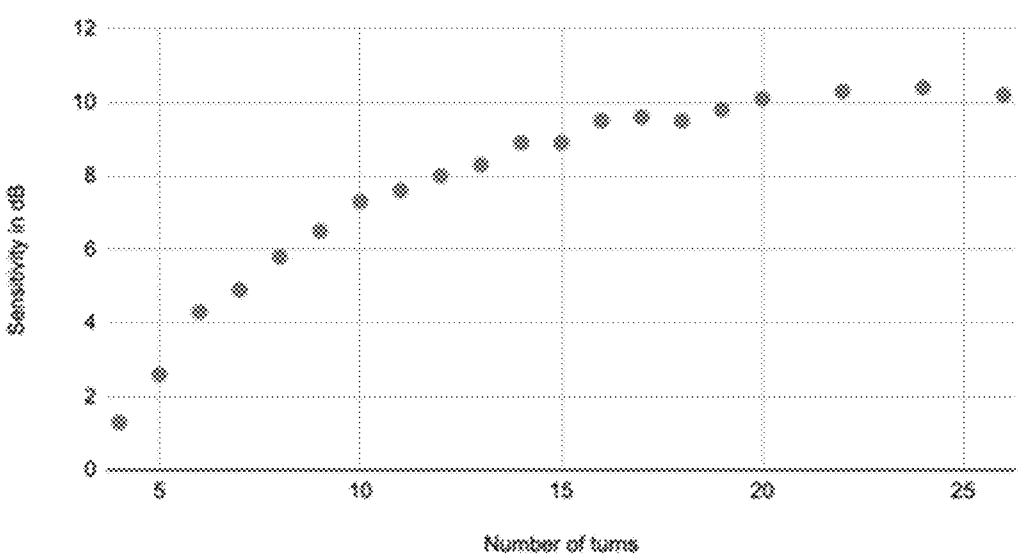
FIG. 5 is a graph of antenna turns versus sensitivity.

FIG. 5 is a graph of antenna turns versus sensitivity. In FIG. 5, the x-axis is the number of turns of the antenna (e.g., the antenna 208 of FIG. 2, the antenna 308 of FIG. 3, etc.), and the y-axis is the sensitivity in dB. FIG. 5 shows that the sensitivity is generally increasing as the number of turns increases.

Figure 6:
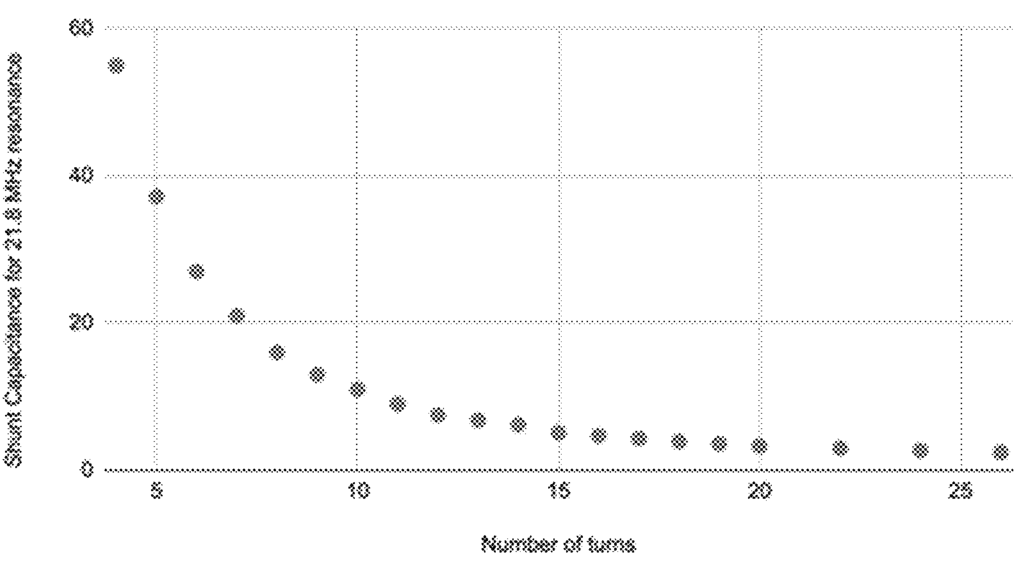
FIG. 6 is a graph of antenna turns versus capacitance.

FIG. 6 is a graph of antenna turns versus capacitance. In FIG. 6, the x-axis is the number of turns of the antenna (e.g., the antenna 208 of FIG. 2, the antenna 308 of FIG. 3, etc.), and the y-axis is the capacitance of the parallel (tuning) capacitor (e.g., the parallel capacitor 206, the parallel capacitor 306) that results in a single-tag resonance of 21.8 MHz. FIG. 6 shows that the required capacitance to result in 21.8 MHz resonance is generally decreasing as the number of turns increases.

Figure 7:
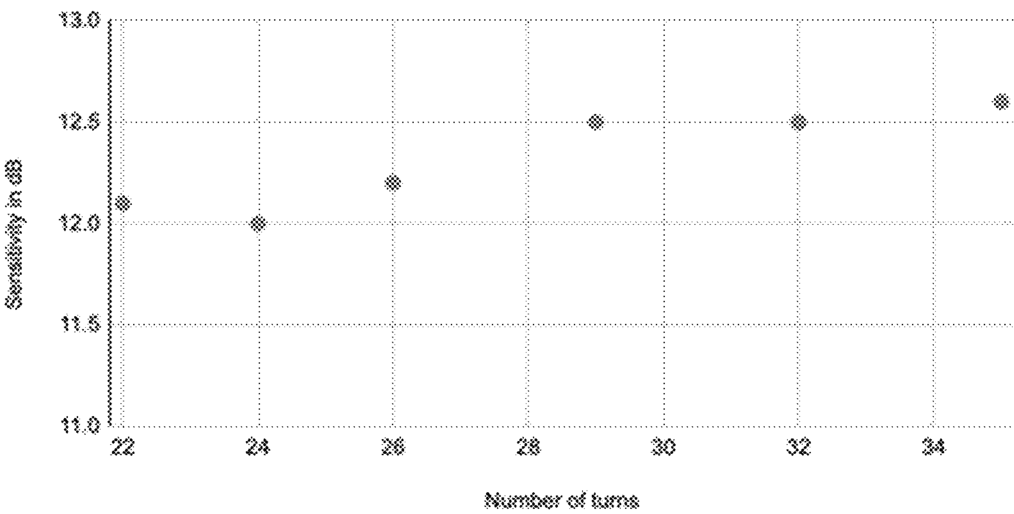
FIG. 7 is a graph of antenna turns versus sensitivity.
Figure 8:
FIG. 8 is a graph of antenna turns versus capacitance.
Figure 8:
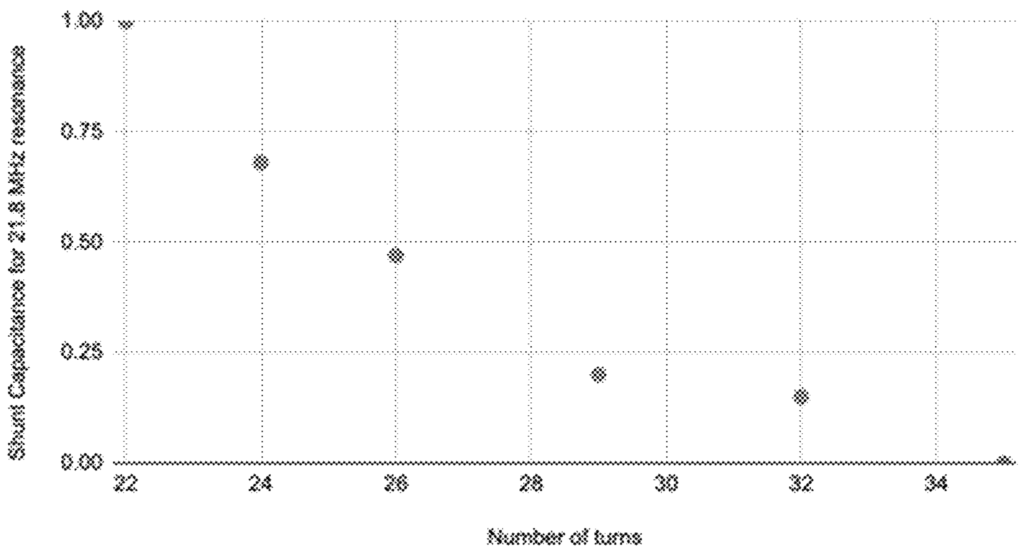

The data for FIGS. 5-6 was generated using an antenna configured to be used in a 39 mm diameter gaming chip and having 0.2 mm trace width and 0.2 mm trace spacing. These constraints limit the number of turns to 26. FIGS. 7-8 use a trace width and spacing of 0.15 mm to further increase the number of turns.

FIG. 7 is a graph of antenna turns versus sensitivity. In FIG. 7, the x-axis is the number of turns of the antenna (e.g., the antenna 208 of FIG. 2, the antenna 308 of FIG. 3, etc.), and the y-axis is the sensitivity in dB. FIG. 7 shows that the sensitivity is generally increasing as the number of turns increases. FIG. 7 extends the range shown in FIG. 5, with FIG. 5 showing the data for 4-26 turns (0.2 mm trace width) and FIG. 7 showing the data for 22-35 turns (0.15 mm trace width).

FIG. 8 is a graph of antenna turns versus capacitance. In FIG. 8, the x-axis is the number of turns of the antenna (e.g., the antenna 208 of FIG. 2, the antenna 308 of FIG. 3, etc.), and the y-axis is the capacitance of the parallel (tuning) capacitor (e.g., the parallel capacitor 206, the parallel capacitor 306) that results in a single-tag resonance of 21.8 MHz. FIG. 8 shows that the required capacitance to result in 21.8 MHz resonance is generally decreasing as the number of turns increases.

A noteworthy feature of FIG. 8 is that for 35 turns, the required capacitance of the parallel capacitor is zero. In such a case, the parallel capacitor (e.g., 206 in FIG. 2, 306 in FIG. 3, etc.) may be omitted; the tuning mainly results from the self-capacitance of the antenna itself. It is expected that an antenna having 36 or more turns would function similarly in similar circumstances.

Another noteworthy feature of FIGS. 7-8 is that with the trace width of 0.15 mm, the increased sensitivity enables the capacitance of the coupling capacitor (e.g., the series circuit element 204 of FIG. 2) to be reduced, e.g. from 3.9 pF to 2.2 pF. This finding is operable for stacks of up to 30 RFID gaming tokens. It is hypothesized that the reduction in coupling efficiency is more than offset by the larger area of the antenna intersecting the excitation B-field. This reduced coupling capacitor may also be incorporated into the tag electronics 302 (see FIG. 3).

Given the data shown in FIGS. 5-8, RFID engineers would be able to adjust the parameters provided in order to conform to other gaming token form factors, e.g., 43 mm diameter tokens, rectangular plaques of various sizes and thicknesses, etc.

As discussed earlier, the present disclosure has similarities to the features of some other existing RFID designs. A first similarity is that the tags are tuned to a higher (non-optimum) frequency such that a reader is able to read a single tag as well as be able to read multiple tags even though the resonance of the grouping of tags has shifted their resonant frequency due to coupling between tags. A second similarity is the use of a series capacitor to lightly couple the tag antenna to the tag electronics to limit the impact of the Zener diode. A third similarity is electromagnetic coupling between a source (e.g., the excitation antenna of the RFID reader) and a receiver (e.g., the antenna of the RFID tag) using the B-field.

However, an embodiment of the present disclosure has a noteworthy difference from many other existing RFID designs: It is much more forgiving as to the degree of collimation of the B-field necessary to properly interrogate a grouping of RFID tags due to an increase in sensitivity of an individual tag. Thus tags can be read whether they are stacked or in an unstructured pile. In a pile, the tags have varying amounts of overlapping, whereas tags in a stack are fully overlapping. As such, in a pile, the proximity of the tags to the excitation field is uncontrolled. In addition, in a pile, the degree of coupling—due to either resonant coupling or ferrite core coupling—can vary. Traditionally, the solution would be to increase the power of the excitation signal. However, the improved sensitivity of the present disclosure thus enhances the ability of the RFID system to read tags in a pile without requiring increased power.

In addition, increasing the number of turns of the antenna increases its stray capacitance and decreases the capacitance of the parallel circuit element needed to tune the resonant frequency of the RFID tag to a desired value (e.g., 21.8 MHz). In fact, above a certain number turns (e.g., 34 turns), the parallel circuit element may be omitted entirely while still obtaining the desired resonant frequency.

As discussed above, when RFID tags are grouped, their resonant frequency lowers. By de-tuning each individual tag higher than the resonant frequency of the excitation signal, the resonant frequency of the group lowers to approach the resonant frequency of the excitation signal. A designer can then balance the degree of de-tuning with the desired sensitivity when reading a group of tags.

In an embodiment, the tags are individually tuned to less than 23 MHz (e.g., 21.8 MHz) such that a group of tags will result in a resonance close to an excitation frequency of 13.56 MHz. This de-tuning still allows a single tag to be powered by the excitation signal and to respond to RFID commands.

Increasing the number of turns of the antenna in the RFID tag results in an inherent inductance and capacitance such that the values of the other components used for tuning may be reduced, or even eliminated (e.g., the shunt capacitor). This allows the construction of tuning components directly on the substrate of the RFID tag, for example by metal deposition directly on the inlay.

ENUMERATED EXAMPLE EMBODIMENTS

Various aspects of the present disclosure may be appreciated from the following enumerated example embodiments (EEEs).

EEE 1. A radio-frequency identification (RFID) tag, comprising: RFID tag electronics; and an antenna assembly coupled to the RFID electronics, wherein the antenna assembly includes an antenna, wherein the antenna has more than 5 turns and has a capacitance. The RFID tag has a resonant frequency resulting from the antenna assembly, wherein the resonant frequency of the RFID tag is higher than an excitation frequency of a transmission generated by an RFID reader. The RFID tag is one of a plurality of RFID tags in proximity in a grouping, wherein the grouping of RFID tags shapes a magnetic flux density field of the transmission generated by the RFID reader through the grouping of RFID tags, wherein the grouping of RFID tags has a resonant frequency that is lower than the resonant frequency of each of the plurality of RFID tags considered individually due to resonant coupling, and wherein the transmission generated by the RFID reader powers the RFID tag electronics via the resonant coupling. A sensitivity of the RFID tag increases as a number of turns of the antenna increases.

EEE 2. The RFID tag of EEE 1, further comprising: a circuit element connected in series between the antenna and the RFID tag electronics, wherein the circuit element includes at least one of a capacitor, an inductor, and a resistor.

EEE 3. The RFID tag of EEE 2, wherein the capacitor has a capacitance of between 1.8 and 3.0 pF.

EEE 4. The RFID tag of EEE 2, wherein the capacitor has a capacitance of between 1.8 and 3.9 pF.

EEE 5. The RFID tag of EEE 2, wherein the circuit element is a component of the antenna assembly.

EEE 6. The RFID tag of any one of EEE 1-5, wherein the capacitance of the antenna assembly results from a self-capacitance of the antenna.

EEE 7. The RFID tag of any one of EEE 1-5, wherein the antenna assembly further comprises a capacitor in parallel with the antenna.

EEE 8. The RFID tag of EEE 7, wherein the capacitor in parallel with the antenna has a capacitance of between 0.125 and 1.0 pF.

EEE 9. The RFID tag of any one of EEE 1-5, wherein the RFID electronics further comprises a capacitor in parallel with the antenna.

EEE 10. The RFID tag of any one of EEE 1-9, wherein the antenna has between 6 and 19 turns.

EEE 11. The RFID tag of any one of EEE 1-9, wherein the antenna has between 20 and 34 turns.

EEE 12. The RFID tag of and one of EEE 1-9, wherein the antenna has 35 or more turns.

EEE 13. The RFID tag of any one of EEE 1-12, wherein a read range between the RFID tag and the RFID reader increases as the number of turns of the antenna increases.

EEE 14. The RFID tag of any one of EEE 1-13, wherein a resonant frequency of the grouping of RFID tags is within 10% above and 10% below the excitation frequency of the RFID reader.

EEE 15. A system for determining locations of objects in a gaming environment, the system comprising: a plurality of radio-frequency identification (RFID) antennas arranged at a plurality of locations on a gaming table; one or more RFID readers coupled to the plurality of RFID antennas; and a plurality of RFID tags. A given RFID tag of the plurality of RFID tags comprises: RFID tag electronics; and an antenna assembly coupled to the RFID electronics, wherein the antenna assembly includes an antenna, wherein the antenna has more than 5 turns and has a capacitance. The given RFID tag has a resonant frequency resulting from the antenna assembly, wherein the resonant frequency of the given RFID tag is higher than an excitation frequency of a transmission generated by the one or more RFID readers. The given RFID tag is one of the plurality of RFID tags in proximity in a grouping, wherein the grouping of RFID tags shapes a magnetic flux density field of the transmission generated by the one or more RFID readers through the grouping of RFID tags, wherein the grouping of RFID tags has a resonant frequency that is lower than the resonant frequency of each of the plurality of RFID tags considered individually due to resonant coupling, and wherein the transmission generated by the one or more RFID readers powers the RFID tag electronics via the resonant coupling. A sensitivity of the given RFID tag increases as a number of turns of the antenna increases.

EEE 16. The system of EEE 15, wherein the given RFID tag further comprises: a circuit element connected in series between the antenna and the RFID tag electronics, wherein the circuit element includes at least one of a capacitor, an inductor, and a resistor.

EEE 17. The system of any one of EEE 15-16, wherein the capacitance of the antenna assembly results from a self-capacitance of the antenna of the given RFID tag.

EEE 18. The system of any one of EEE 15-16, wherein the antenna assembly further comprises a capacitor in parallel with the antenna of the given RFID tag.

EEE 19. The system of any one of EEE 15-16, wherein the RFID electronics further comprises a capacitor in parallel with the antenna of the given RFID tag.

EEE 20. The system of any one of EEE 15-17, wherein the antenna of the given RFID tag has 35 or more turns.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A radio-frequency identification (RFID) tag, comprising:

RFID tag electronics; and an antenna assembly coupled to the RFID electronics, wherein the antenna assembly includes an antenna, wherein the antenna has more than 5 turns and has a capacitance, wherein the RFID tag has a resonant frequency resulting from the antenna assembly, wherein the resonant frequency of the RFID tag is higher than an excitation frequency of a transmission generated by an RFID reader, wherein the RFID tag is one of a plurality of RFID tags in proximity in a grouping, wherein the grouping of RFID tags shapes a magnetic flux density field of the transmission generated by the RFID reader through the grouping of RFID tags, wherein the grouping of RFID tags has a resonant frequency that is lower than the resonant frequency of each of the plurality of RFID tags considered individually due to resonant coupling, and wherein the transmission generated by the RFID reader powers the RFID tag electronics via the resonant coupling, and wherein a sensitivity of the RFID tag increases as a number of turns of the antenna increases.

2. The RFID tag of claim 1, further comprising:

a circuit element connected in series between the antenna and the RFID tag electronics, wherein the circuit element includes at least one of a capacitor, an inductor, and a resistor.

3. The RFID tag of claim 2, wherein the capacitor has a capacitance of between 1.8 and 3.0 pF.

4. The RFID tag of claim 2, wherein the capacitor has a capacitance of between 1.8 and 3.9 pF.

5. The RFID tag of claim 2, wherein the circuit element is a component of the antenna assembly.

6. The RFID tag of claim 1, wherein the capacitance of the antenna assembly results from a self-capacitance of the antenna.

7. The RFID tag of claim 1, wherein the antenna assembly further comprises a capacitor in parallel with the antenna.

8. The RFID tag of claim 7, wherein the capacitor in parallel with the antenna has a capacitance of between 0.125 and 1.0 pF.

9. The RFID tag of claim 1, wherein the RFID electronics further comprises a capacitor in parallel with the antenna.

10. The RFID tag of claim 1, wherein the antenna has between 6 and 19 turns.

11. The RFID tag of claim 1, wherein the antenna has between 20 and 34 turns.

12. The RFID tag of claim 1, wherein the antenna has 35 or more turns.

13. The RFID tag of claim 1, wherein a read range between the RFID tag and the RFID reader increases as the number of turns of the antenna increases.

14. The RFID tag of claim 1, wherein a resonant frequency of the grouping of RFID tags is within 10% above and 10% below the excitation frequency of the RFID reader.

15. A system for determining locations of objects in a gaming environment, the system comprising:

a plurality of radio-frequency identification (RFID) antennas arranged at a plurality of locations on a gaming table;

one or more RFID readers coupled to the plurality of RFID antennas; and a plurality of RFID tags, wherein a given RFID tag of the plurality of RFID tags comprises:

RFID tag electronics; and an antenna assembly coupled to the RFID electronics, wherein the antenna assembly includes an antenna, wherein the antenna has more than 5 turns and has a capacitance, wherein the given RFID tag has a resonant frequency resulting from the antenna assembly, wherein the resonant frequency of the given RFID tag is higher than an excitation frequency of a transmission generated by the one or more RFID readers, wherein the given RFID tag is one of the plurality of RFID tags in proximity in a grouping, wherein the grouping of RFID tags shapes a magnetic flux density field of the transmission generated by the one or more RFID readers through the grouping of RFID tags, wherein the grouping of RFID tags has a resonant frequency that is lower than the resonant frequency of each of the plurality of RFID tags considered individually due to resonant coupling, and wherein the transmission generated by the one or more RFID readers powers the RFID tag electronics via the resonant coupling, and wherein a sensitivity of the given RFID tag increases as a number of turns of the antenna increases.

16. The system of claim 15, wherein the given RFID tag further comprises:

a circuit element connected in series between the antenna and the RFID tag electronics, wherein the circuit element includes at least one of a capacitor, an inductor, and a resistor.

17. The system of claim 15, wherein the capacitance of the antenna assembly results from a self-capacitance of the antenna of the given RFID tag.

18. The system of claim 15, wherein the antenna assembly further comprises a capacitor in parallel with the antenna of the given RFID tag.

19. The system of claim 15, wherein the RFID electronics further comprises a capacitor in parallel with the antenna of the given RFID tag.

20. The system of claim 15, wherein the antenna of the given RFID tag has 35 or more turns.

* * * * *